(12) United States Patent
Linnberg

(10) Patent No.: US 10,730,409 B2
(45) Date of Patent: Aug. 4, 2020

(54) SEAT SWIVEL LIMITER

(71) Applicant: Sears Manufacturing Co., Davenport, IA (US)

(72) Inventor: Jeffrey D Linnberg, Bettendorf, IA (US)

(73) Assignee: Sears Manufacturing Co., Davenport, IA (US)

( * ) Notice: Subject to any disclaimer, the term of this patent is extended or adjusted under 35 U.S.C. 154(b) by 24 days.

(21) Appl. No.: 16/103,965

(22) Filed: Aug. 16, 2018

(65) Prior Publication Data
US 2020/0055426 A1 Feb. 20, 2020

(51) Int. Cl.
*B60N 2/06* (2006.01)
*B60N 2/14* (2006.01)
*B60N 2/38* (2006.01)

(52) U.S. Cl.
CPC .............. *B60N 2/146* (2013.01); *B60N 2/06* (2013.01); *B60N 2/38* (2013.01)

(58) Field of Classification Search
USPC ........................................ 297/344.22, 344.24
See application file for complete search history.

(56) References Cited

U.S. PATENT DOCUMENTS

| | | | | |
|---|---|---|---|---|
| 1,547,849 A | * | 7/1925 | Van Den Boogaard | A47C 3/18 108/142 |
| 1,808,659 A | * | 6/1931 | Hultgren | B61D 33/0085 248/425 |
| 1,916,800 A | * | 7/1933 | Hultgren | B61D 33/0085 297/340 |
| 3,066,979 A | * | 12/1962 | Pitts | B60N 2/14 297/240 |
| 3,659,895 A | * | 5/1972 | Dresden | B60N 2/14 296/65.05 |
| 3,874,626 A | * | 4/1975 | Gross | B60N 2/14 248/562 |
| 3,975,050 A | * | 8/1976 | McKee | A47C 1/026 297/328 |
| 4,097,016 A | * | 6/1978 | Petrucci | A47C 3/18 108/142 |
| 4,155,593 A | * | 5/1979 | Swenson | B60N 2/143 297/284.11 |
| 4,705,256 A | * | 11/1987 | Hofrichter | B60N 2/146 248/349.1 |

(Continued)

FOREIGN PATENT DOCUMENTS

| | | | | |
|---|---|---|---|---|
| CA | 2956232 A1 | * | 9/2017 | ............... B60N 2/14 |
| DE | 4309894 A1 | * | 10/1993 | ............. B60N 2/143 |

*Primary Examiner* — Robert Canfield
(74) *Attorney, Agent, or Firm* — Lane & Waterman LLP

(57) ABSTRACT

A seat assembly having a seat structure supported on a base structure and having a swivel mechanism for permitting pivoting of the seat structure, includes a seat swivel limiter that limits the swivel angle of the seat depending on the fore-aft position of the seat structure. The limiter includes a swivel stop connected to the seat structure to pivot with the seat structure and a plate connected to the base structure and arranged to be contacted by the swivel stop after the seat structure pivots through a predetermined swivel limit angle to thereby prevent further swiveling of the seat structure. In a further aspect, the swivel stop and the plate are configured to provide different swivel limit angles depending on the fore-aft location of the seat.

8 Claims, 5 Drawing Sheets

(56) References Cited

U.S. PATENT DOCUMENTS

| | | | | |
|---|---|---|---|---|
| 4,792,188 A * | 12/1988 | Kawashima | ............ | B60N 2/146 248/418 |
| 5,482,354 A * | 1/1996 | Gryp | ........................ | A47C 3/18 297/344.22 |
| 6,021,989 A * | 2/2000 | Morita | .................... | B60N 2/143 248/349.1 |
| 6,361,111 B1 * | 3/2002 | Bowers | .................... | A47C 3/18 297/344.22 |
| 7,472,958 B2 * | 1/2009 | Sano | ...................... | B60N 2/146 297/344.21 |
| 8,205,945 B2 * | 6/2012 | Ma | ........................... | B60N 2/14 248/349.1 |
| 9,180,792 B2 * | 11/2015 | Haller | .................... | B60N 2/508 |
| 9,211,812 B2 * | 12/2015 | Haller | .................... | B60N 2/508 |
| 10,071,805 B2 * | 9/2018 | Porter | .................... | B60N 2/146 |
| 2007/0284905 A1 * | 12/2007 | Bailey | ................. | B60N 2/0232 296/65.07 |
| 2009/0127908 A1 * | 5/2009 | Kucharski | ............ | B60N 2/0707 297/344.24 |
| 2015/0108811 A1 * | 4/2015 | Muehlbauer | ........... | B60N 2/143 297/344.21 |
| 2017/0320406 A1 * | 11/2017 | Roeglin | ................... | B60N 2/10 |

* cited by examiner

SEAT SWIVEL LIMITER

FIELD OF THE DISCLOSURE

The present invention relates to adjustable seats and, more specifically, to a swivel seat in a vehicle.

BACKGROUND

Vehicle seats which are adjustable and which swivel are common and in wide use today. Such seats are widely used in agricultural vehicles as such vehicles often pull implements or attachments and passengers frequently rotate or swivel to visually monitor such implement or attachment which is generally located behind the vehicle. Such seats are generally also adjustable in the fore and aft direction to accommodate different passengers or different operating positions. In vehicles like tractors, the steering wheel, brakes, and other controls are generally set up in the front of the vehicle for use when the passenger is in a forward facing position.

Because access to these controls in a timely manner is a safety concern, it may be desirable to limit the degree to which a seat may swivel so that passengers cannot swivel too far out of reach of such controls. It is desirable therefore to allow the passenger to swivel the seat to a certain degree to accommodate the need for passengers to view the area behind the vehicle but that limits the degree of swivel so that the controls are readily accessible if the need arises.

Additionally, it may be desirable to allow different degrees of rotation or swivel dependent on the fore and aft location of the seat. It is further desirable to permit tailoring the location of the different degrees of rotation or swivel to accommodate the preferences of the passenger.

SUMMARY

In one aspect, a seat assembly comprises a seat structure configured for receiving a passenger seated thereon, a base structure for supporting the seat structure on a surface, and a swivel mechanism between the seat structure and the base structure for permitting pivoting of the seat structure relative to the base structure. In one aspect of the present disclosure, a seat swivel limiter is provided that limits the swivel angle of the seat. The limiter can include a swivel stop connected to the seat structure to pivot with the seat structure and a plate connected to the base structure and arranged to be contacted by the swivel stop after the seat structure pivots through a predetermined swivel limit angle to thereby prevent further swiveling of the seat structure. In a further aspect, the seat assembly includes a rail assembly configured to permit fore and aft movement of the seat structure relative to the base structure, and the swivel stop and the plate are configured to provide different swivel limit angles depending on the fore-aft location of the seat.

DETAILED DESCRIPTION

Figure 1:
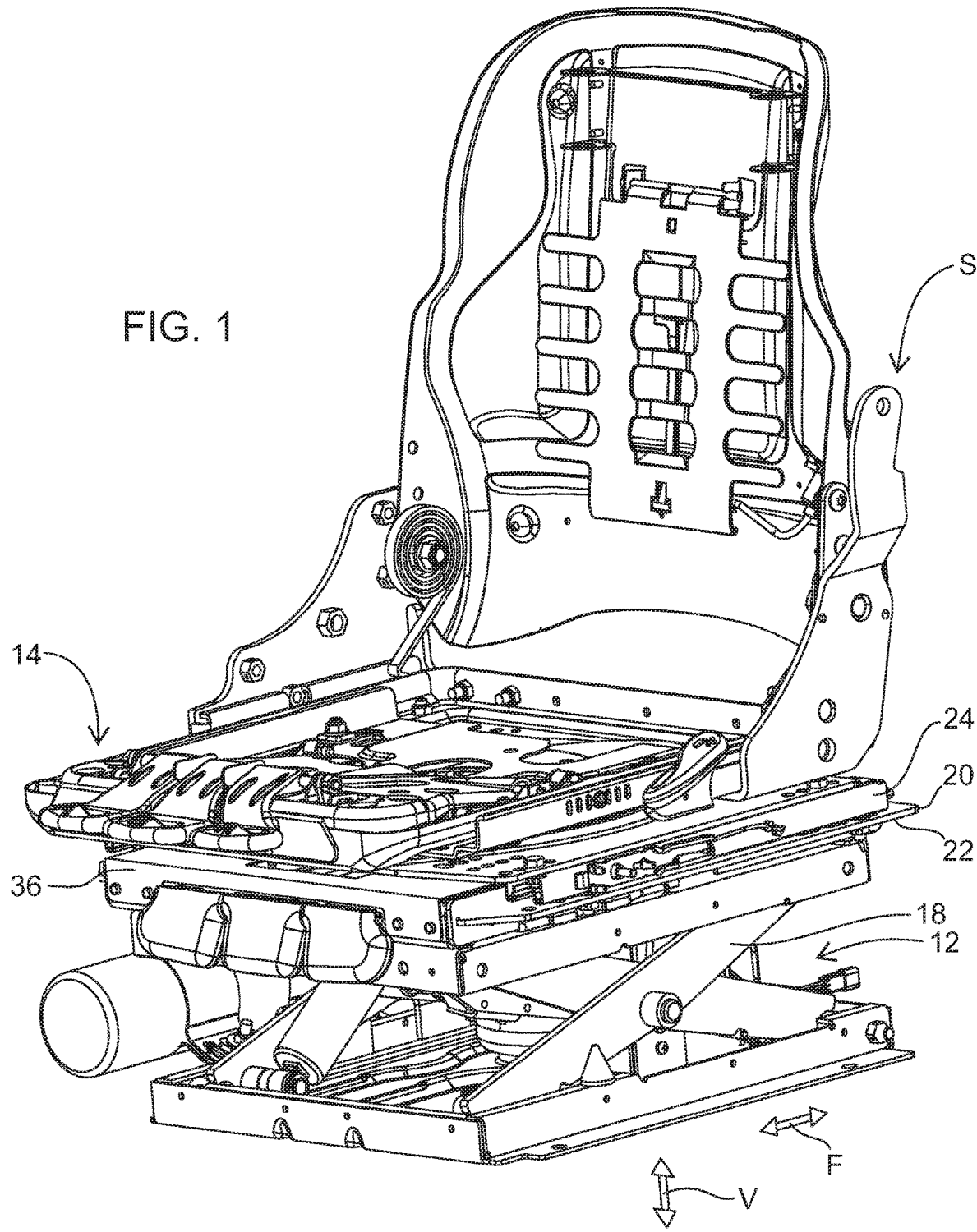
FIG. 1 is a partial cutaway view of a seat assembly incorporating the swivel stop of the present disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

A seat assembly S shown in FIG. 1 incorporates mechanisms to permit movement or adjustment of the seat in multiple degrees of freedom. The assembly includes a base structure 12 which can be any type of base structure or mount that is commonly known or used in the industry to affix a seat structure 14 to a vehicle. Frequently, such base structures 12 include suspension elements 18 that permit height adjustment of the seat in the direction V as well as providing shock or vibration absorption features. In the seat assembly S shown in FIG. 1 the suspension element is a scissors type mechanism. The base structure 12 includes an upper base frame 20 with flanges 22 on each side that provide a mounting surface for a rail assembly 24 which allows the seat structure 14 to move in the fore and aft direction F. The rail assembly 24 can be a two-piece design, with a movable rail 24a associated with the seat structure and a stationary rail 24b associated with the base structure 12. However, other rails assemblies or similar mechanisms that permit fore and aft movement can be used.

Figure 2:
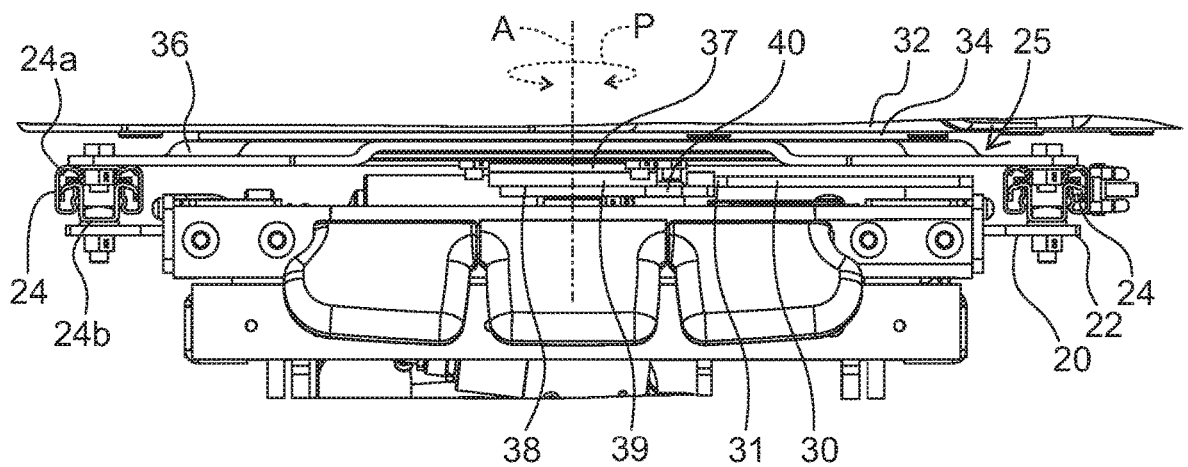
FIG. 2 is a front view of a portion of the base and the swivel mechanism of the seat assembly of FIG. 1.
Figure 3:
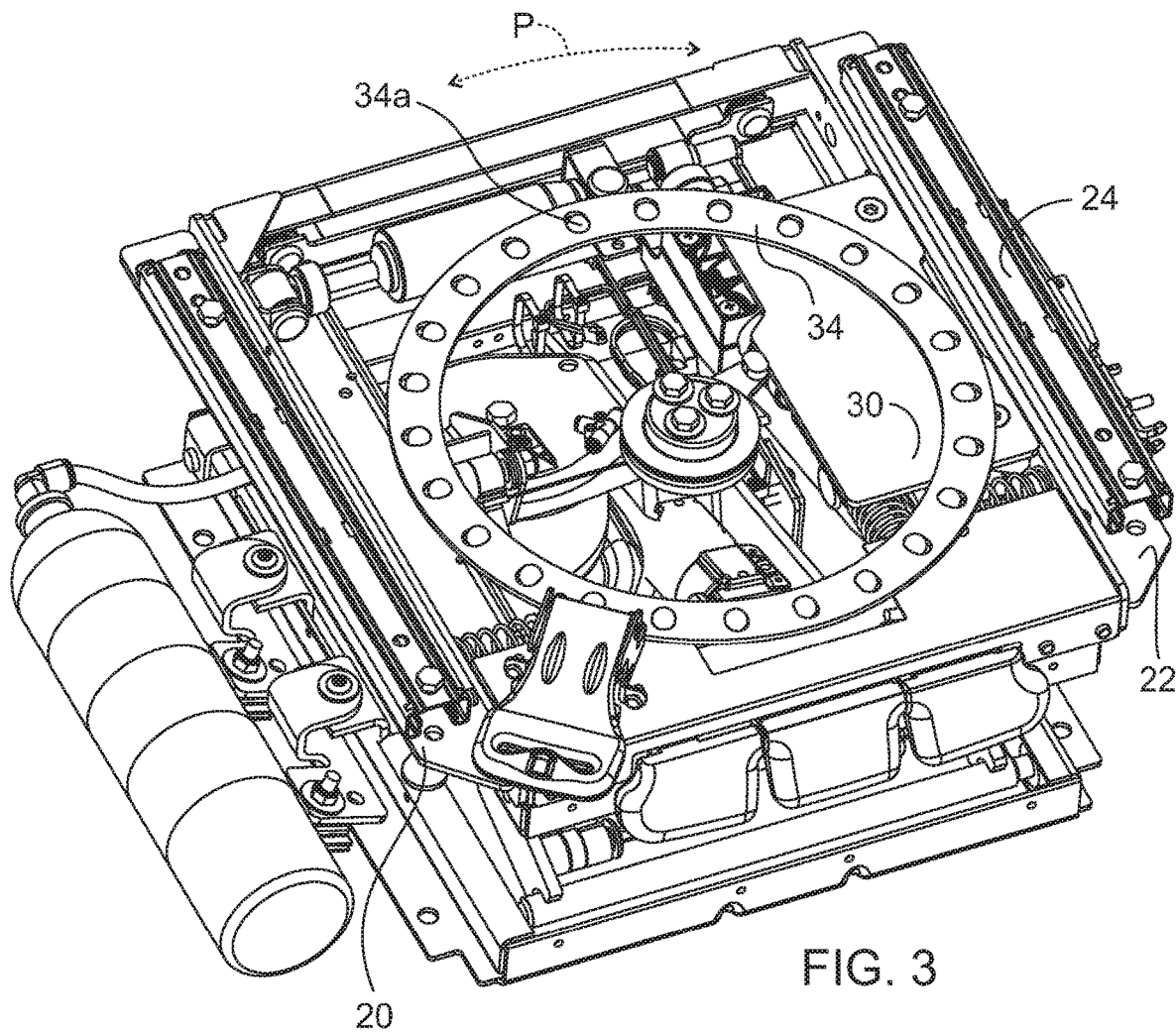
FIG. 3 is a top perspective partial cut-away view of the seat assembly shown in FIG. 2 showing a portion of the swivel mechanism with the swivel stop of the present disclosure.

Referring to FIGS. 2-3, the seat assembly S further includes a swivel mechanism 25 that permits swiveling or pivoting P of the seat structure 14 about the center axis A of the seat structure. The seat structure 14 includes a seat pan 32 and below the seat pan is a seat swivel ring 34 that includes a plurality of caged roller bearings 34a. The seat swivel ring 34 is sandwiched between the seat pan 32 and a lower swivel race 36 to form the swivel mechanism 25. The seat pan 32 includes a center hub 37 that extends through an opening in the swivel ring 34 and lower swivel race 36 for centering the swivel mechanism. The lower swivel race 36 is mounted to the movable rail 24a of the rail assembly 24 supported on the upper base frame. The rail assembly 24 allows the lower swivel race 36, swivel seat ring 34 and seat pan 32 to move fore and aft, which thus provides the fore and aft movement of the seat structure 14. It can be appreciated that the seat assembly can swivel or pivot at any fore and aft position of the seat structure 14 relative to the base structure 12. The swivel mechanism can be of the type disclosed in U.S. Pat. No. 5,482,354, issued on Jan. 19, 1996.

Figure 4:
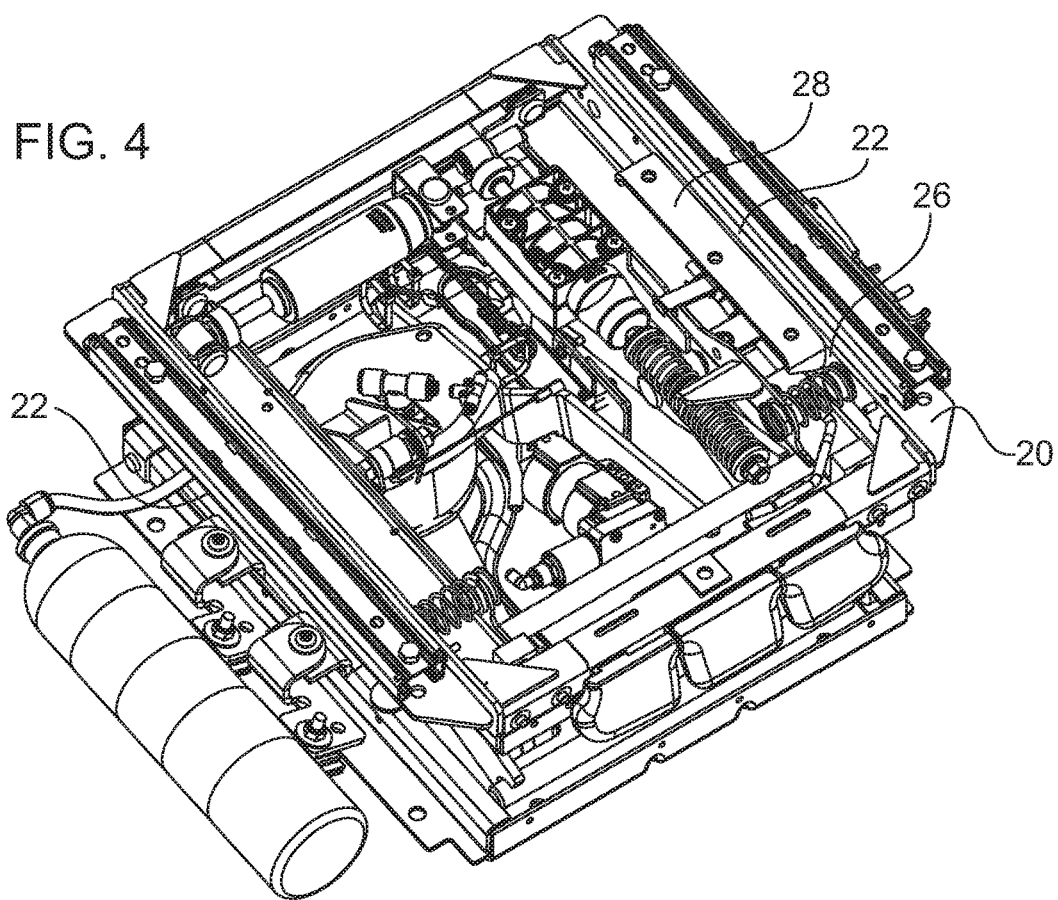
FIG. 4 is a perspective partial cut-away view of the base of the seat assembly shown in FIGS. 1-3, shown with a mounting bracket for the swivel stop of the present disclosure.
Figure 5:
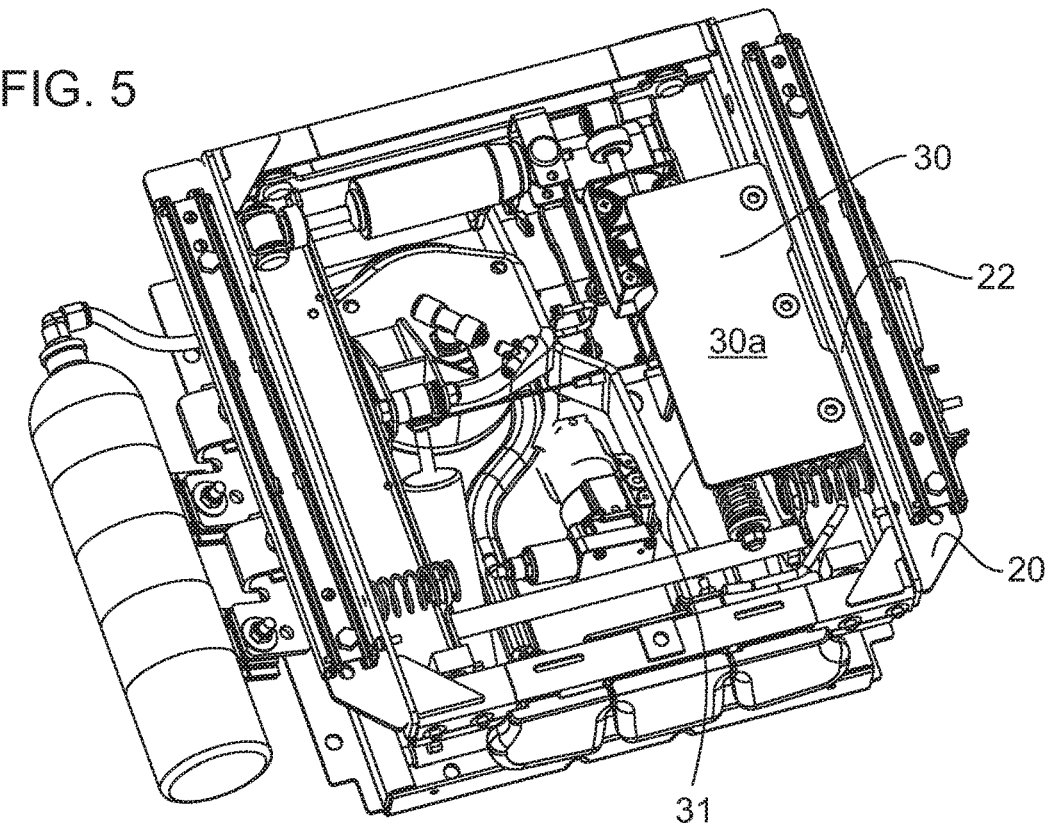
FIG. 5 is a perspective partial cut-away view of the base of the seat assembly shown in FIGS. 1-3, shown with a plate for the swivel stop of the present disclosure.

Turning to FIGS. 4-5, the upper base frame 20 is a generally rectangular shaped frame with the two side flanges 22 extending fore and aft. A mounting bracket 28 is mounted to the base frame adjacent one of the flanges 22, preferably the flange on the outboard side of the seat assembly S for ease of access. The mounting bracket 28 can be mounted to the frame by any suitable means including welding or with fasteners. In one aspect, the mounting bracket 28 is positioned below the edge 26 in order to support a plate 30 with the top surface 30a of the plate flush with or slightly below the edge 26. In other words, the mounting bracket 28 and plate 30 are configured to be contained within the envelope of the upper base frame 20 so as not to interfere with other components and mechanism of the seat assembly S. The plate 30 can be attached to the mounting bracket 28 by any suitable means including welding or fasteners. In one aspect, the swivel stop bracket 30 is attached to the mounting bracket 28 by bolts that are countersunk to be flush with the top surface 30a of the plate 30. It can be appreciated that the mounting bracket 28 and plate 30 need not be formed from separate pieces but could be of unitary construction. However, the two-piece design shown FIGS. 4-5 has the advantage of making allowing the plate 30 to be easily replaced.

The plate 30 is part of a swivel stop arrangement that limits the angular range through which the seat structure 14 is permitted to swivel or pivot. The plate 30 thus forms the stationary component of the swivel stop arrangement. A swivel stop 38 is mounted to the seat pan 32 to swivel or pivot with the seat pan, and thus the seat structure 14 relative to the base structure 12. In one embodiment, the swivel stop 38 includes a central plate 39 that is mounted to the central hub 37 so that the swivel stop 38 is positioned below the lower swivel race 36 and more particularly is positioned in alignment with the inboard edge 31 of the plate 30, as depicted in FIG. 2. In one embodiment, the central plate 39 of the swivel stop 38 can be fastened to the bottom of the central hub 37 by the same fasteners used to fasten the central hub to the seat pan 32.

Figure 6:
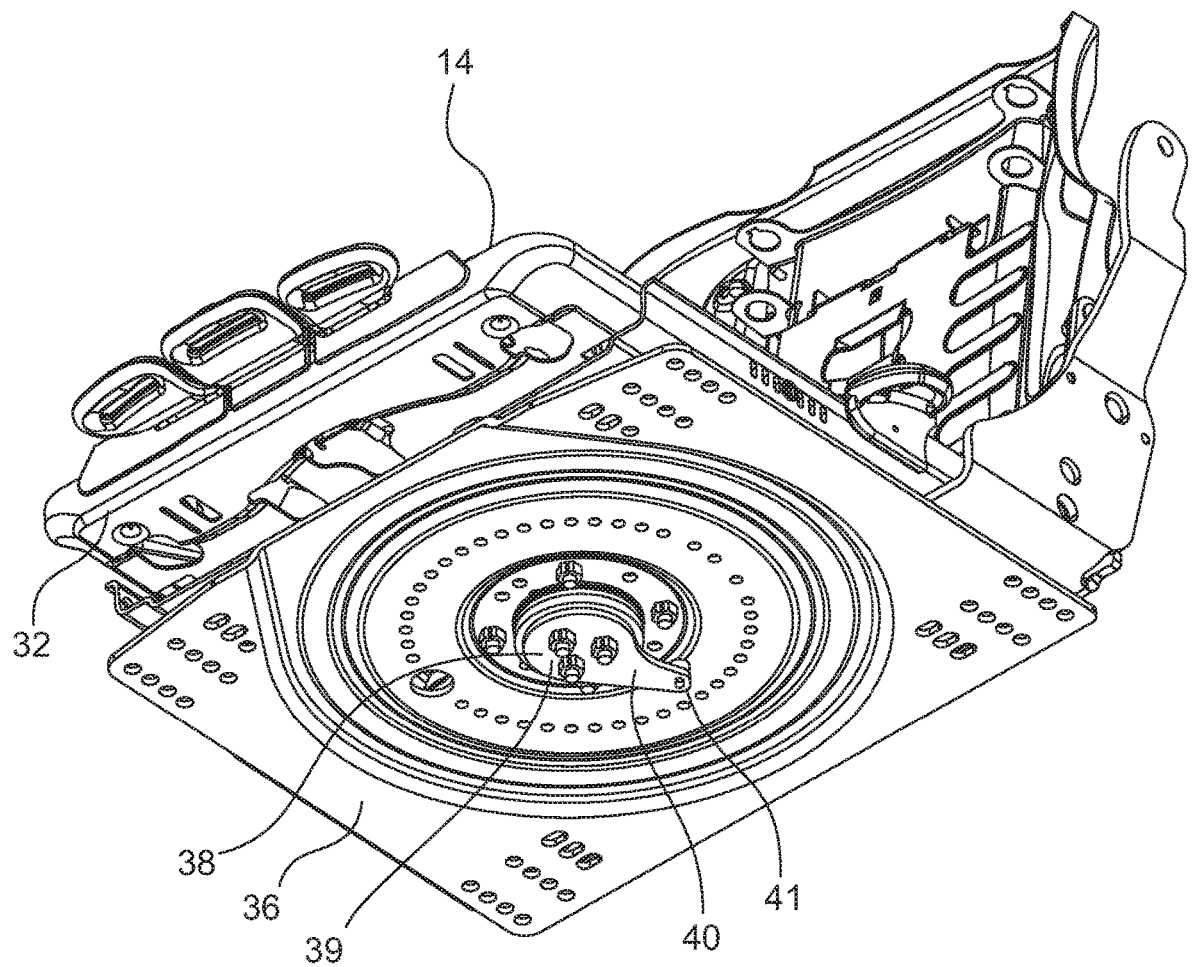
FIG. 6 is a perspective view of the underside of the seat structure of the seat assembly shown in FIGS. 1-3 with part of the swivel mechanism and part of the swivel stop of the present disclosure shown.

As shown in more detail in FIG. 6, the swivel stop 38 includes an arm 40 that extends from the central plate 39 of the swivel stop toward the stationary plate 30. The arm 40 may include a knob 41 that is adapted to contact the edge 31 of the plate 30. The swivel stop is thus mounted such that when the seat 14 is swiveled or pivoted, the swivel stop 38 turns with it until the knob 41 contacts the inboard edge 31 of the stationary plate 30. In this way, the swivel angle is limited to prevent the passenger seated in the seat assembly S from over-pivoting the seat.

Figure 7A:
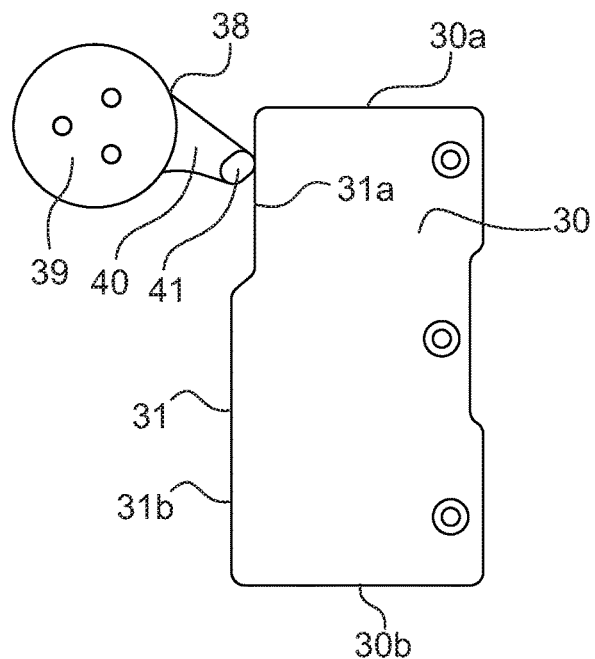
FIGS. 7(a), 7(b) are top plan views of the swivel stop incorporated into the seat assembly shown in FIGS. 1-3 showing the swivel stop in different angular orientations and the seat structure in different fore and aft positions.
Figure 7B:
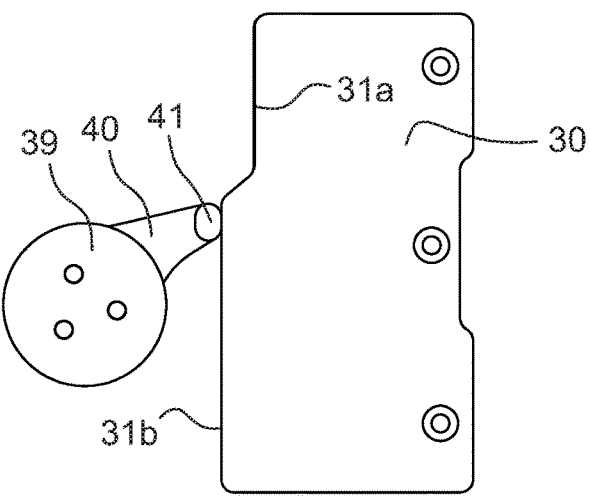

In one aspect of the seat assembly 10, the inboard edge 31 of the plate 30 includes two sections, 31a, 31b as shown in FIGS. 7(a), 7(b), that can be contacted by the swivel stop 38, depending upon the fore-aft location of the seat structure 14. In particular, the section 31a is recessed slightly relative to the section 31b. The section 31a is adjacent the aft edge 30a of the plate 30 corresponding to the aft-most position of the seat. The section 31b extends from the recessed section 31a to the forward edge 30b of the plate, corresponding to the forward-most position of the seat. The recessed location of the section 31a is thus arranged so that the knob 41 of the swivel stop 38 engages the recess only when the seat structure is in its aft-most position. In all other positions, the knob of the swivel stop 38 contacts the edge section 31b. The recessed section 31a is further configured so that the swivel stop 38 can pivot or swivel through a greater angle than at the edge section 31b. In other words, the pivot angle limit is dependent upon the location on the edge 31 at which the swivel stop 38 contacts the edge. When the seat structure 14 is at its aft-most position, as depicted in FIG. 7(a), the seat structure 14 can pivot through a greater angle than if the seat is forward of this position, as depicted in FIG. 7(b). In one specific embodiment, the recessed edge section 31a is configured so that the swivel stop 38 contacts the edge section 31a after 50° of seat rotation or pivot. On the other hand, the non-recessed edge section 31b is configured so that the seat, and thus the swivel stop, can only rotate to a swivel limit angle of 40°.

Figure 8:
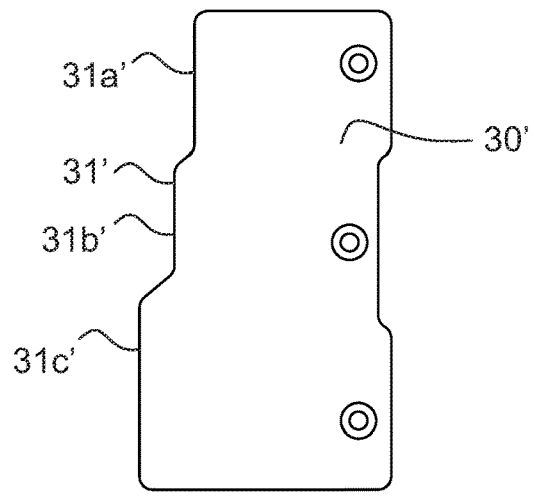
FIG. 8 is a top plan view of a plate of the swivel stop incorporated in the seat assembly shown in FIGS. 1-3, the plate having an alternate configuration.

It is contemplated that the plate 30 is configured for removal and replacement, either by disconnecting it from the mounting bracket 28, or by removing the plate with the mounting bracket. A new plate 30' having a different configuration for the edge 31', as shown in FIG. 8, may be mounted to the frame 20. In this specific embodiment, the plate 30' includes two recessed edge sections 31a' and 31b' and one non-recessed edge section 31c'. The two recessed edge sections 31a', 31b' are recessed to different depths so that the swivel stop 38 contacts each section at different swivel angles. Other configurations of the edge 31, 31' are contemplated, including a continuously edge having an angled or gradually curved configuration.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed.

What is claimed is:

1. A seat assembly comprising:
    a seat structure configured for receiving a passenger seated thereon;
    a base structure for supporting the seat structure on a surface;
    a swivel mechanism between the seat structure and the base structure for permitting pivoting of the seat structure about a substantially vertical axis relative to the base structure;
    a swivel stop connected to the seat structure to pivot with the seat structure; and
    a plate connected to the base structure and arranged to be contacted by the swivel stop after the seat structure pivots through a predetermined swivel limit angle to thereby prevent further swiveling of the seat structure, wherein the swivel stop and the plate are configured to provide different swivel limit angles depending on a fore-aft location of the seat.

2. The seat assembly of claim 1, further comprising a rail assembly between said seat structure and said base structure configured to permit fore and aft movement of the seat structure relative to the base structure.

3. The seat assembly of claim 2, wherein the swivel stop and the plate are configured to provide a swivel limit angle of 50 degrees when the seat structure is in the aft location and a swivel limit angle of 40 degrees when the seat structure is in any other fore-aft location.

4. The seat assembly of claim 1, wherein:
    the swivel mechanism includes;
    a seat pan included in the seat structure;
    a lower swivel race included in the base structure;
    a swivel ring disposed between the seat pan and the lower swivel race; and a hub mounted to the seat pan and extending through openings in said swivel ring and lower swivel race; and said swivel stop is mounted to said hub on the side of said lower swivel race opposite said seat pan.

5. The seat assembly of claim 1, wherein said swivel stop includes a central plate connected to the swivel mechanism and an arm extending outward from said central plate toward said plate connected to the base structure.

6. The seat assembly of claim 1, wherein the plate and swivel stop are configured so that the swivel stop contacts an inboard edge of the plate to prevent further pivoting or rotation of the swivel stop.

7. The seat assembly of claim 6, wherein the inboard edge of said plate includes one section recessed relative to another section, wherein the swivel stop contacts the one section and the another section at different swivel angles.

8. The seat assembly of claim 7, wherein the plate is removable for replacement with another plate having a differently configured inboard edge.

\* \* \* \* \*